(12) United States Patent
Park et al.

(10) Patent No.: US 10,739,481 B2
(45) Date of Patent: Aug. 11, 2020

(54) 2D MULTILINE SEISMIC REFLECTION TOMOGRAPHY WITH SEISMIC-TIE CONSTRAINT

(71) Applicants: Jaewoo Park, The Woodlands, TX (US); Carey M. Marcinkovich, The Woodlands, TX (US); Rongrong Lu, The Woodlands, TX (US)

(72) Inventors: Jaewoo Park, The Woodlands, TX (US); Carey M. Marcinkovich, The Woodlands, TX (US); Rongrong Lu, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 611 days.

(21) Appl. No.: 15/450,854

(22) Filed: Mar. 6, 2017

(65) Prior Publication Data

US 2017/0285194 A1    Oct. 5, 2017

Related U.S. Application Data

(60) Provisional application No. 62/315,283, filed on Mar. 30, 2016.

(51) Int. Cl.
 *G01V 1/30* (2006.01)
 *G01V 1/28* (2006.01)

(52) U.S. Cl.
 CPC .............. *G01V 1/303* (2013.01); *G01V 1/282* (2013.01); *G01V 2210/512* (2013.01); *G01V 2210/614* (2013.01); *G01V 2210/6222* (2013.01); *G01V 2210/679* (2013.01)

(58) Field of Classification Search
 CPC .. G01V 1/303; G01V 1/282; G01V 2210/614; G01V 2210/679; G01V 2210/512; G01V 2210/6222
 See application file for complete search history.

(56) References Cited

U.S. PATENT DOCUMENTS

| | | |
|---|---|---|
| 5,132,938 A | 7/1992 | Walters |
| 2007/0203673 A1* | 8/2007 | Sherrill ................... G01V 1/30 702/189 |

(Continued)

OTHER PUBLICATIONS

Jaewoo Park et al., "Multiple regularization constraints in tomographic inversion; Application to synthetic model with shallow gas clouds overlying deep reservoir," SEG Las Vegas 2012 Annual Meeting, pp. 1-4 (2012) (Year: 2012).*

(Continued)

*Primary Examiner* — Rehana Perveen
*Assistant Examiner* — Steven W Crabb
(74) *Attorney, Agent, or Firm* — ExxonMobil Upstream Research Company-Law Department

(57) ABSTRACT

A method, including: generating updated velocity models, each corresponding to one of a plurality of initial velocity models of intersecting 2D seismic survey lines, wherein updates to the plurality of initial velocity models are computed by imposing a seismic-tie regularization constraint on an inversion process that inverts for the updates to the plurality of initial velocity models, and the seismic-tie regularization constraint causes the updated velocity models to have consistent values for depth of seismic reflectivity at intersecting spatial locations.

12 Claims, 10 Drawing Sheets

(56) References Cited

U.S. PATENT DOCUMENTS

| | | | | |
|---|---|---|---|---|
| 2011/0075516 A1* | 3/2011 | Xia | ................... | G01V 1/303 |
| | | | | 367/53 |
| 2011/0103187 A1* | 5/2011 | Albertin | ................ | G01V 1/28 |
| | | | | 367/73 |
| 2016/0109589 A1* | 4/2016 | Liu | ................... | G01V 1/282 |
| | | | | 702/14 |
| 2016/0341835 A1* | 11/2016 | Guillaume | ............ | G01V 1/303 |

OTHER PUBLICATIONS

Bernard Giroux et al., "bh_tomo—a Matlab borehole georadar 2D tomography package," Computers & Geosciences 33 pp. 126-137 (Year: 2007).*

Woodward, M., et al. (2008) "A decade of tomography" *Geophysics*, 73, No. 5, pp. VE5-VE11.

Zelt, C. A. et al. (1998) "Three-dimensional seismic refraction tomography: A comparison of two methods applied to data from the Faeroe Basin", *Journal of Geophysical Research*, vol. 103, Issue B4, pp. 7187-7210.

* cited by examiner

2D MULTILINE SEISMIC REFLECTION TOMOGRAPHY WITH SEISMIC-TIE CONSTRAINT

CROSS-REFERENCE TO RELATED APPLICATION

This application claims the benefit of U.S. Provisional Patent Application 62/315,283 filed Mar. 30, 2016 entitled 2D MULTILINE SEISMIC REFLECTION TOMOGRAPHY WITH SEISMIC-TIE CONSTRAINT, the entirety of which is incorporated by reference herein.

FIELD OF THE INVENTION

Exemplary embodiments described herein generally pertain to the field of geophysical prospecting, and more particularly to 2D multi-line seismic reflection tomography.

BACKGROUND

This section is intended to introduce various aspects of the art, which may be associated with the present technological advancement. This discussion is believed to assist in providing a framework to facilitate a better understanding of particular aspects of the present technological advancement. Accordingly, it should be understood that this section should be read in this light, and not necessarily as admissions of prior art.

In the oil and gas industry, seismic prospecting techniques are commonly used to aid in the search for and evaluation of subterranean hydrocarbon deposits. A seismic prospecting operation consists of three separate stages: data acquisition, data processing, and data interpretation.

In the data acquisition stage, a seismic source is used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the Earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the Earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

In exploration geophysics, seismic velocity model building followed by imaging is a routinely used method to depict subsurface geological structures around target oil and gas reservoirs. When understanding of regional geological structures is needed, multiple 2D seismic surveys are often conducted in a target area, and then processed line by line, resulting in a seismic image and velocity model for each individual line. If multiple 2D lines are intersecting each other, seismic image or velocity at intersecting locations often does not match each other because of: 1) random noise and measurement error in data causes inconsistent velocity updates from each line even at the same spatial location; 2) reflection tomography, commonly used in industry to improve an existing velocity model, is based on nonlinear inversion where model changes at each iterative update can vary depending upon several factors (e.g., data selection, initial model and smoothing constraint); and 3) 2D models from 2D reflection tomography often cannot represent real 3D earth, especially when geological structures are highly dipping. This is the so called out-of-plane effect; waves do not necessarily travel within a 2D plane between source and receiver because seismic wave propagation is governed by seismic properties of the earth (i.e., seismic velocity), usually varying spatially in 3D.

In-consistent seismic images at the same spatial location of intersecting points from different 2D lines makes it difficult to interpret for a correct regional geological structure from those seismic images. In order to make seismic image or velocity at a same spatial location consistent for multiple 2D lines, industry often takes two distinct approaches; 1) after generating a seismic image based on a certain velocity model and data from each line, shift seismic traces to be consistent at intersecting points by manual or automatic process (Walters, 1992), or 2) before generating a seismic image, develop a velocity model for each line which makes corresponding seismic images be consistent at intersecting points (so that there is no need to arbitrarily shift or alter seismic traces near intersecting points, to match them each other).

In order to develop 2D velocity models which makes seismic images be consistent for intersecting lines, industry sometimes applies 3D tomography using 3D source and receiver geometries, obtaining a 3D velocity model, from which a 2D model is extracted. It can be reliable for a variety of acquisition types including crooked 2D line, but is not efficient for 2D lines intersecting with large azimuth, i.e., around 90 degrees, and is sometimes computationally impractical for high resolution updates, if an acquisition line is too long.

Another alternative approach is to perform 2D tomography for each line, and manually adjust velocity at intersecting locations. This 2D line-by-line approach is computationally efficient and can handle a very long acquisition lines. However, it requires extra work to adjust velocity to make seismic images tied at intersecting points, which can be difficult to reconcile especially when many lines are intersecting each other.

SUMMARY

A method including: generating updated velocity models, each corresponding to one of a plurality of initial velocity models of intersecting 2D seismic survey lines, wherein updates to the plurality of initial velocity models are computed by imposing a seismic-tie regularization constraint on an inversion process that inverts for the updates to the plurality of initial velocity models, and the seismic-tie regularization constraint causes the updated velocity models to have consistent values for depth of seismic reflectivity at intersecting spatial locations.

In the method, a system of equations for the 2D seismic survey lines can be merged diagonally, instead of vertically, to cause the updated velocity models to have consistent values for depth of seismic reflectivity at intersecting spatial locations.

In the method, the system of equations that are merged diagonally can include null matrices on an diagonal opposite to a diagonal for the system of equations for the 2D seismic survey lines.

In the method, the system of equations that are merged diagonally can include a trade-off parameter to adjust regularization of the seismic-tie regularization constraint.

In the method, the inversion process can determine the updates to the plurality of initial velocity models from residual depth error measurements from common image gathers, raytracing based on the initial velocity models, and the seismic-tie regularization constraint.

The method can further include: from each of the plurality of initial velocity models, generating a 2D seismic reflectivity image from a 2D pre-stack depth migration; determining, for each 2D seismic reflectivity image, how much a selected reflector's depth shifts up or down along offset with respect to particular reference depth; and generating the updates to the plurality of initial velocity models with the seismic-tie regularization constraint and the reflector's depth shifts.

In the method, the particular reference depth can be a nearest offset trace.

In the method, the inversion process can determine a velocity update using a numerical solver, and the method further includes splitting the velocity update determined by the inversion process into a separate update for each of the plurality of initial velocity models.

In the method, the plurality of intersecting 2D seismic survey lines can each have a different seismic-tie regularization constraint.

The method can further include updating at least one of the initial velocity models by adjusting a trade-off parameter included in the seismic-tie regularization constraint.

In the method, as the trade-off parameter increases, greater weight can be placed on the seismic-tie constraint.

The method can further include using the updated velocity models to generate a subsurface image of the Earth.

The method can further include drilling a well at a location determined at least in part from the updated velocity models and extracting hydrocarbons from the well.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the present technological advancement is not limited to the specific embodiments described below, but rather, it includes all alternatives, modifications, and equivalents falling within the true spirit and scope of the appended claims.

This present technological advancement can adopt the approach of making a proper 2D velocity model for each line, described at the end of Background section, but resolves the seismic mis-tie problem automatically by incorporating a seismic-tie regularization constraint into tomographic inversion.

Figure 1:
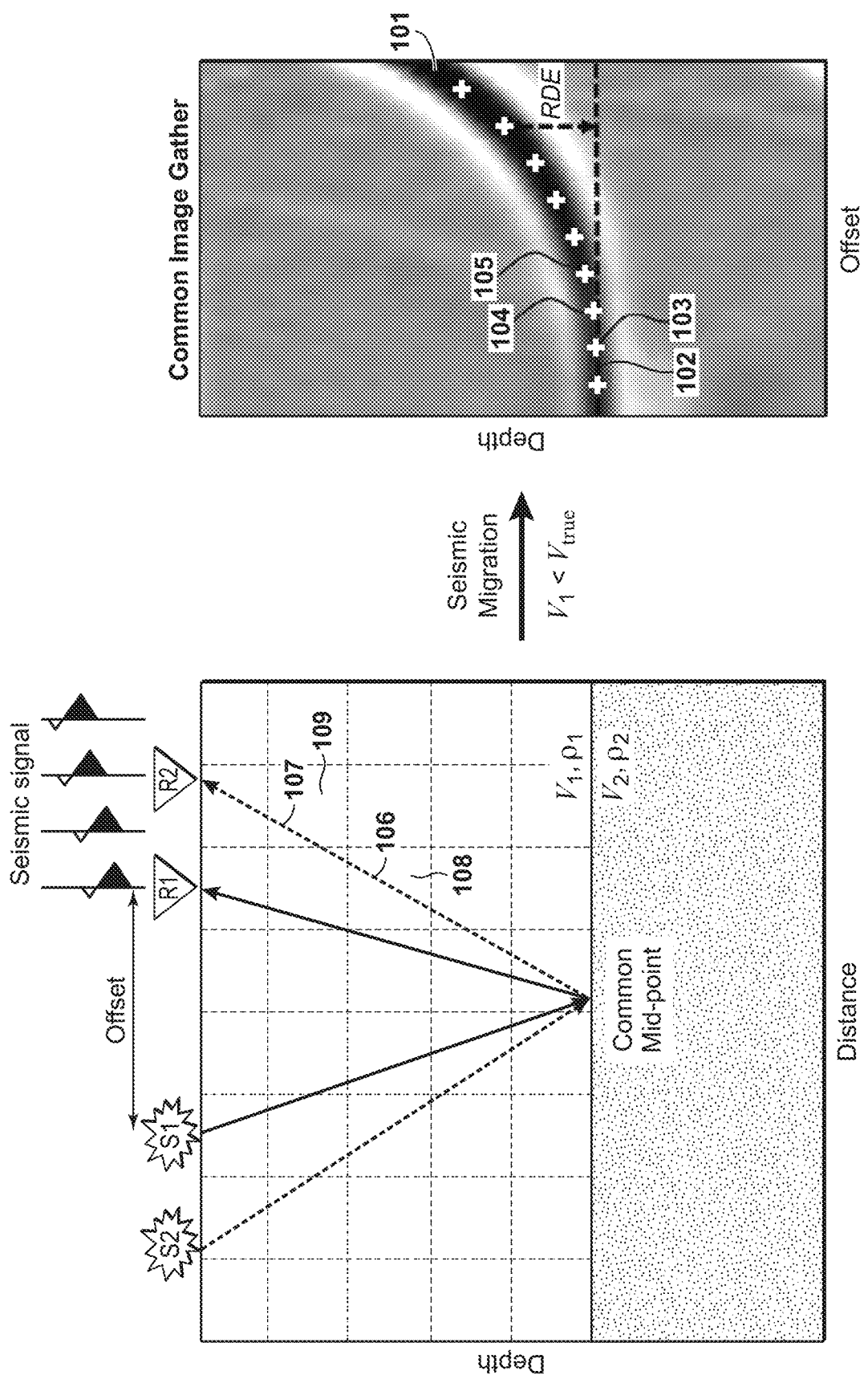
FIG. 1 illustrates an example of seismic acquisition and a corresponding common image gather, generated by seismic depth migration technique.

Seismic Pre-stack Depth Migration (PSDM) is a technique that depicts subsurface structures by accurately positioning seismic reflectivity between geological strata. A correct velocity of a target area is a fundamental requirement to avoid mis-positioning of reflectivity and deterioration of seismic image quality. In order to obtain a correct velocity, geophysicists often develop a smooth initial velocity model first, and then sequentially improve it with various methods and data. As an automatic method to improve an initial velocity, a seismic reflection tomography method is widely adopted, in which existing velocity is iteratively updated by inverting from seismic data misfit (Woodward et al., 2008). Data misfit is often constructed by measuring depth change of residual moveout curve (101) along offset with respect to a certain depth, typically the nearest trace (102), in the PSDM CIG gather (FIG. 1). For example, FIG. 1 is a schematic illustration that shows seismic acquisition with sources S1 and S2 and receivers R1 and R2, where waves reflect at a common midpoint between the sources and receivers. Seismic signal recorded at receivers are mapped to seismic reflectivity image for subsurface structure, in which Common Image Gather (CIG) image can be generated along different offset (101). The residual moveout curve (101) is curving up in this example; Residual Depth Error (RDE) is negatively increasing with offset, which indicates migration velocity is slower than true velocity. If velocity is correct, CIG is usually flat.

The amount of gather non-flatness is proportional to deviation of current velocity from a correct value, which can be described as, $$\int_{raypath} 1/v \, ds = d_{rde} \quad (1)$$

where $d_{rde}$ is RDE for various offsets (103, 104, 105 . . . ) between seismic sources and receivers, v is seismic velocity and s is a segment length of a ray (106 or 107) within a tomographic inversion cell (108 or 109). A ray path can be calculated by various raytracing algorithms (known to those of ordinary skill in the art) based on a given velocity model because ray path is governed by slowness (1/v) of a material, unknowns for the system of Equation (1). Since ray path is a function of velocity, the above system of Equation (1) becomes highly nonlinear.

With a use of the first order approximation for a nonlinear equation, Equation (1) can be linearized, and described in a matrix form as, $$Gm = d_{rde} \quad (2)$$

where G is raytracing kernel matrix, $d_{rde}$ is data vector of RDE and m is unknown vector of slowness change (1/dv). The unknown m can be iteratively updated by inverting data $d_{rde}$ with raytracing information. However, due to data uncertainty and nonlinearity of Equation (1), many different models m can equally fit data well within data error tolerance. Since most geological structure is smoothly varying spatially, it is more advisable to choose a velocity model which fits the data well and is spatially smooth. This can be accomplished with a regularization constraint, typically described as the first or second derivative matrix of model parameterization as below, $$Rm = d_{rc} \quad (3)$$

where R is the regularization matrix of the first and/or second order derivative combined (Zelt and Barton, 1998), $d_{rc}$ is data vector of regularization constraint, and determines whether a smoothness constraint is applied to a model change or an updated model itself. Equation (3) can be incorporated into a ray tracing matrix in Equation (2) as below, $$\begin{pmatrix} G \\ R \end{pmatrix} (m) = \begin{pmatrix} d_{rde} \\ d_{rc} \end{pmatrix} \quad (4)$$

Then, Equation (4) can be further simplified into, $$Am = d \quad (5)$$

where A is a tomography kernel, including ray path information G and smoothing regularization R, m is the unknowns of velocity change with respect to an initial velocity, and d is data vector, typically residual moveout measurement in depth, attached with the right-hand-side of a regularization constraint from Equation (3).

Assuming two 2D lines are intersecting at one common-mid-point (CMP) location, we can setup an equation for each 2D reflection tomography, $$Am_A = d_A \quad (6)$$

$$Bm_B = d_B \quad (7)$$

where A and B are tomography kernels, $m_A$ and $m_B$ are unknowns of velocity change with respect to each initial velocity, and vector of $d_A$ and $d_B$ includes RDE in depth and the right-hand-side of smoothing regularization constraint (Equation (3)) for each 2D line.

In order to make seismic images at an intersecting point consistent, an velocity change needs to make updated velocity to be equivalent at the same spatial location (x,y,z) if geological structure is horizontally flat (e.g. there is no out-of-plane effect). This requirement can be described as below, even in the case where each line has different initial velocity, $V_i$ and $V_j$ respectively $$m_i + V_i = m_j + V_j \quad (8)$$

where $m_i$ and $m_j$ are velocity change with respect to each initial model at an intersecting point. To develop a new system of equations for 2D multi-line reflection tomography with velocity-tie constraints, Equations (6) and (7) are combined diagonally as described below, $$\begin{pmatrix} A & 0 \\ 0 & B \\ \hline 0...\lambda...0 & 0...-\lambda...0 \end{pmatrix} \begin{pmatrix} m_{A_1} \\ \vdots \\ m_i \\ \vdots \\ m_{A_N} \\ m_{B_1} \\ \vdots \\ m_j \\ \vdots \\ m_{B_N} \end{pmatrix} = \begin{pmatrix} d_A \\ d_B \\ \lambda(V_j - V_i) \end{pmatrix} \quad (9)$$

where 0 is null matrix and $\lambda$ is a trade-off parameter to adjust regularization of the velocity-tie constraint with respect to the original system of Equations (6) and (7). A column index of $\lambda$ corresponds to a row index of velocity unknown at a certain depth located at intersecting points. In particular, all column indices of the second system of Equation (7) need to be shifted by the total number of unknown for the first system of Equation (6): in Equation (9), $j+A_n$ is column index of $\lambda$ for the second system of Equation (7). If more than two 2D lines are intersecting each other, an additional system of equations can be merged into Equation (9) in the same way as constructed for two intersecting lines. A solution for Equation (9) would satisfy data misfit as well as make velocity be consistent at intersecting points.

Figure 2:
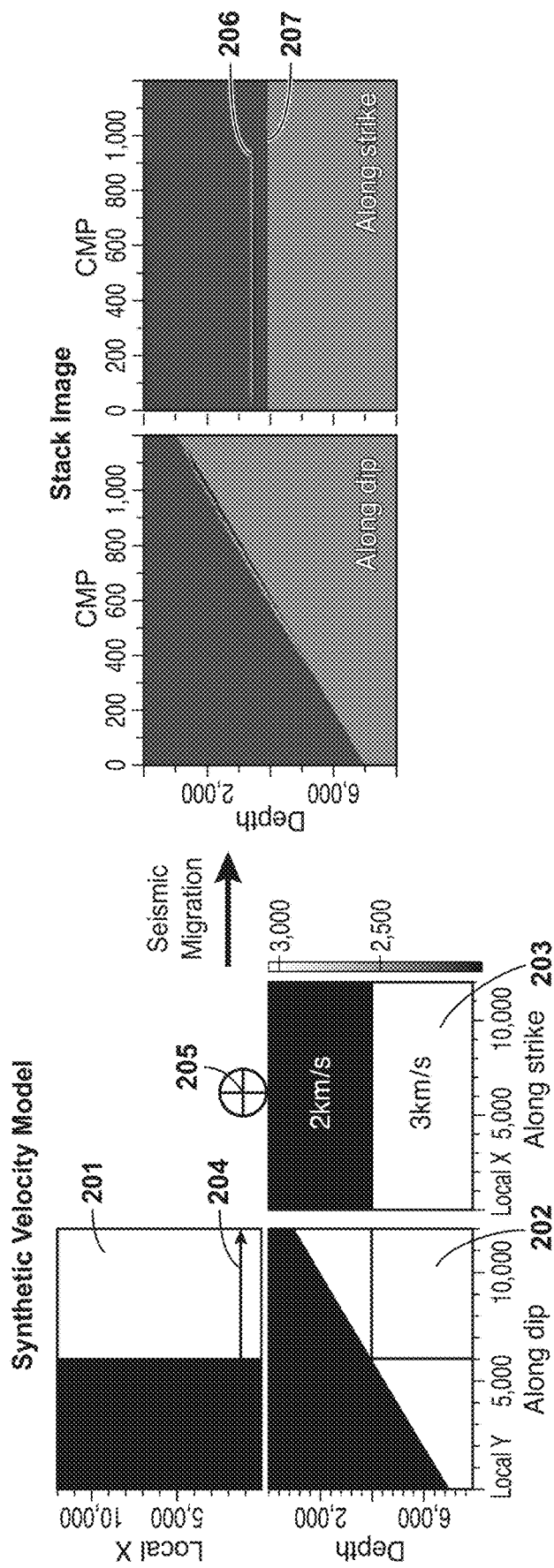
FIG. 2 illustrates the generation of an exemplary 2D stack image from an synthetic model.

However, when geological structure is steeply dipping with an angle of $\theta_j$ along a dip direction, out-of-plane effect cannot be ignored so that equivalent velocity at intersecting points could not accomplish the same depth of a seismic reflectivity image for different lines. FIG. 2 shows three slices of a synthetic 3D velocity model (201, 202, 203), in which two seismic acquisition directions (along dip and strike) are shown by arrow (204) and nail head (205), and a corresponding 2D PSDM stack image for each direction using a correct velocity. A seismic reflector (206) along a strike direction is positioned shallower than a correct depth (207) due to out-of-plane effect.

Figure 3:
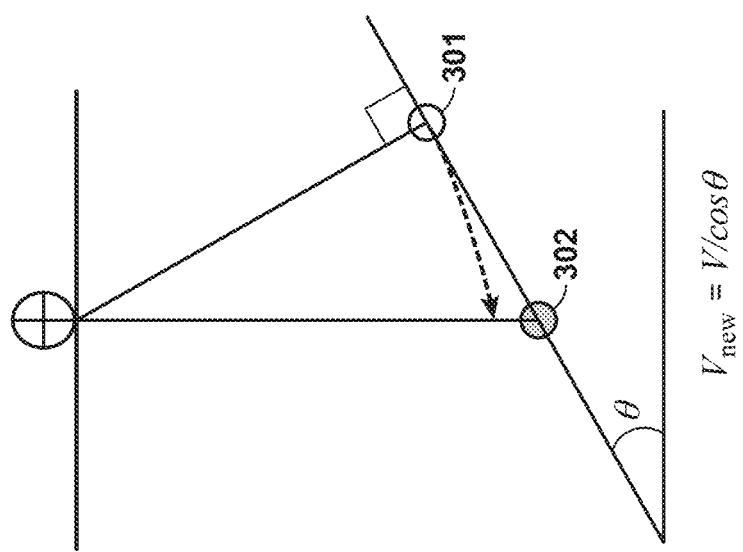
FIG. 3 illustrates a cause of the out-of-plane effect.

Since seismic waves tend to follow the shortest path as possible (Snell's law), 2D velocity from 2D tomography along the strike direction should be corrected to make a same seismic reflector be positioned at a correct same depth. FIG. 3 provides a schematic illustration to show why a seismic reflector in a 2D seismic image along the strike direction (301) is positioned shallower than a correct depth (302) even with a true velocity used for migration. In order to position seismic reflectivity to the correct depth (302), overburden velocity need to be adjusted by a geometric correction parameter, 1/cos θ.

Based on an assumption that geological structures are locally continuous, 2D velocity along a dipping direction ($V_j$) of a reflector can be related with velocity along strike direction of the reflector ($V_i$) as below.

$$V_i = V_j / \cos \theta_j \quad (10)$$

Thus, Equation (9) can be modified to compensate for out-of-plane effect on 2D velocity from 2D reflection tomography, $$\begin{pmatrix} A & 0 \\ 0 & B \\ 0...\frac{\lambda}{\cos\theta_i}...0 & 0...-\frac{\lambda}{\cos\theta_j}...0 \end{pmatrix} \begin{pmatrix} m_{A_1} \\ \vdots \\ m_i \\ \vdots \\ m_{A_N} \\ m_{B_1} \\ \vdots \\ m_j \\ \vdots \\ m_{B_N} \end{pmatrix} = \begin{pmatrix} d_A \\ d_B \\ \lambda\left(\frac{V_j}{\cos\theta_j} - \frac{V_i}{\cos\theta_i}\right) \end{pmatrix} \quad (11)$$

where $\theta_j$ is a dipping angle of a reflector in a perpendicular direction to seismic acquisition. Compared with Equation (9), Equation (11) would not necessarily result in a same updated velocity at intersecting points, but leads to a better seismic-tie in a PSDM image.

The unknowns m are typically computed numerically by inverting a kernel and data matrix with an inversion solver. Common numerical solvers, i.e., LSQR and CGLS, efficiently handle a sparse linearized system of equation by using only non-zero elements in the matrix. In Equations (9) and (11), a seismic-tie constraint matrix is much sparser and smaller in size than kernel matrix, such that additional memory requirement and computational cost is negligible with respect to a line-by-line 2D tomography approach.

Compared with an existing approach to handle velocity mis-tie from multiple 2D line tomography, the present technological advancement can efficiently invert for velocity models for multiple 2D lines simultaneously and provide each line with a proper velocity update to tie migrated seismic traces at intersecting locations. It eliminates a need for post-tomography manual velocity editing, and ensures that seismic traces at intersecting points will be consistent even if initial velocities from intersecting lines differ.

The present technological advancement can accommodate multiple 2D reflection tomography problems simultaneously with multiple seismic-tie constraints for different lines, or can update velocity for an individual line without any tie constraint by adjusting a trade-off parameter, λ. For example, by setting λ to 0, Equation (9) and (11) provide the same solution as individual 2D reflection tomography is processed separately to fit data and smoothing regularization only. If λ increases, a solution for Equation (9) and (11) will have more emphasis on seismic-tie constraint rather than data and smoothing regularization. This flexibility can be useful where geological structures are rapidly varying laterally so that overburden velocity cannot be assumed to be continuous locally; a trade-off parameter λ needs to be reduced accordingly.

The present technological advancement, which incorporates multiple 2D seismic datasets into one system of equation, can be applicable to any 2D inversion method (e.g. 2D full waveform inversion (FWI)) or survey of different geophysical measurement (e.g. gravity, magnetic and electromagnetic data) when a material property-tie constraint at intersecting points is needed.

Figure 4:
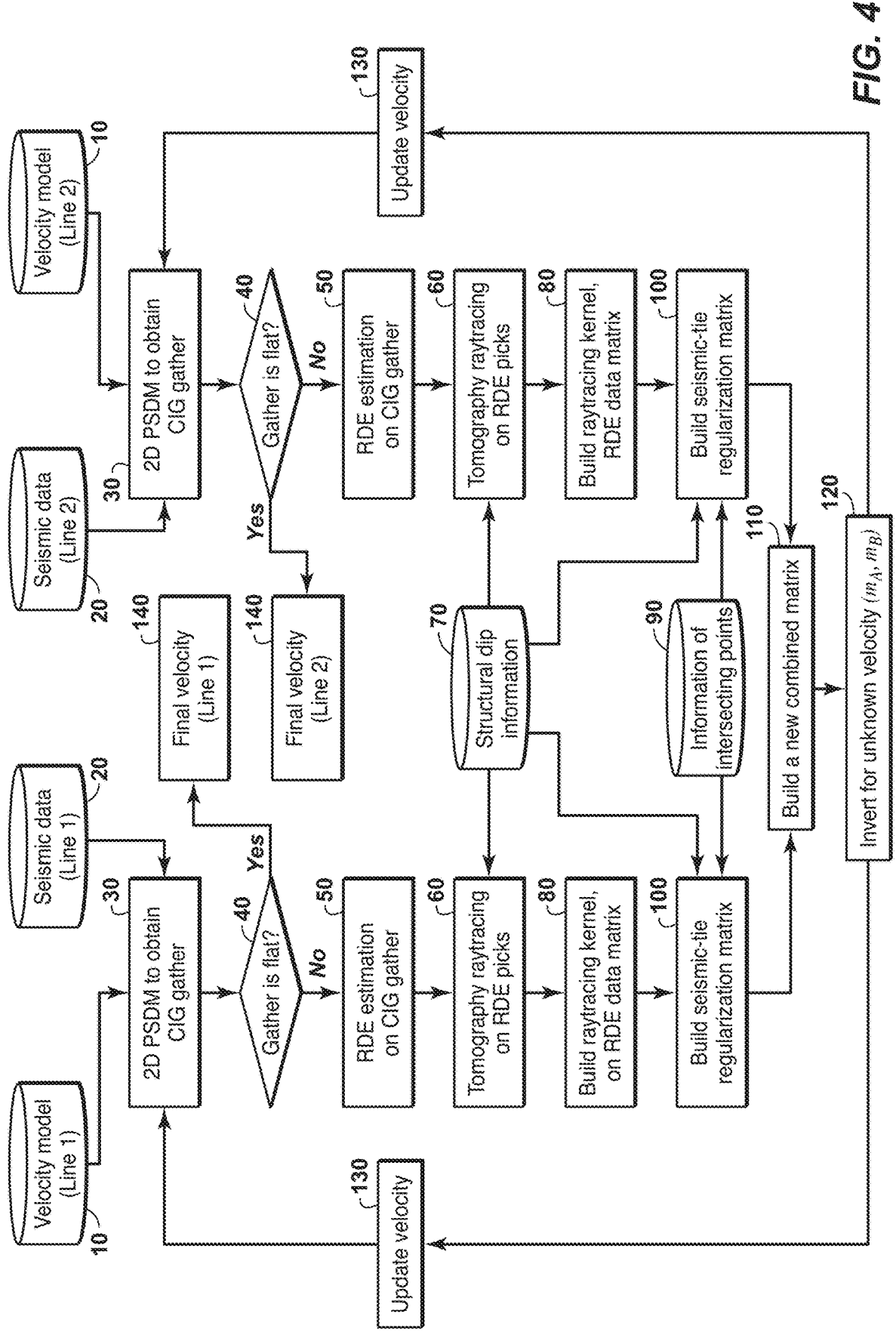
FIG. 4 illustrates an exemplary method of carrying out the present technological advancement.

FIG. 4 provides an example of a method for implementing the present technological advancement. This is an example of two intersecting 2D survey lines, called by Line 1 and Line 2, respectively. More than two lines can also be implemented with the present technological advancement in the same way.

Step 10 includes developing an initial 2D velocity model for each seismic acquisition line. An initial model usually includes long wavelengths of velocity features for geological structure.

Step 20 includes preparing seismic data for a PSDM algorithm to generate offset (or angle) CIG gather by doing offset-binning and/or data regularization if necessary.

Step 30 includes running PSDM, i.e., Kirchhoff, RTM or Beam migration, using seismic data (step 20) and an initial velocity (step 10) or updated velocity from the step 130 to generate offset (or angle) gather for each 2D seismic line.

Step 40 includes, if the gather from step 30 is not sufficiently flat, proceeding to step 50. If gather is sufficiently flat, the method proceeds to step 140.

Step 50 includes estimating residual depth error (RDE) in gather for each line. Output from this step (RDE picks and their location information) serves as an input for a subsequent reflection tomography.

Step 60 includes executing 2D reflection tomography raytracing using an initial or updated velocity for each line (step 10 and 130) based on a certain parameterization of a tomographic inversion grid (see FIG. 1). A tomographic raytracing can include building files of travel time and reflection angle tables over a target update region based on the initial velocity model and assumed location of sources using any one of various known methods of seismic raytracing; tracing two rays back from each location of RDE measurement to sources and receivers on the surface, respectively.

Step 70 includes estimating dip information of geological structure using a seismic stack image, derived from stacking CIG gather (step 30) along an offset axis, or other geological information.

Step 80 includes building a raytracing kernel with measurements of ray segment length within parameterized tomographic cells (step 60) and dip information (step 70). If tomographic cells are hit by rays, write out the length of a ray segment as non-zero element of raytracing kernel, and write out column index and row index count files corresponding to non-zero elements. Write out a regularization matrix that imposes a smallest and smoothest model constraint. A data matrix from RDE for each line (step 50) is built and written out as files.

Step 90 includes estimating CIG location for each line at intersecting points, and corresponding structural dip angle perpendicular to strike direction of geologic structure.

Step 100 includes building a seismic-tie constraint matrix for Equation (8) based on information about inversion grid, CMP location of intersecting points and initial velocity models for each line; calculating row indices of inversion cells at intersecting points for each line; utilize row indices as column indices for non-zero elements of seismic-tie regularization matrix; generating a non-zero element file with a value of $\lambda/\cos\theta_j$, where $\lambda$ is a trade-off parameter to control seismic-tie constraint and $\theta_j$ is a dipping angle of a reflector in a perpendicular direction to seismic acquisition; generating a row index count file by counting the number of non-zero values for a particular inversion cell (typically an index count is 2 if only a single cell for each line needs to be tied); and generating the right-hand-side matrix for seismic-tie constraint with a value of $\lambda(V_j/\cos\theta_j - V_i/\cos\theta_i)$. If subsurface geologic structure is not steeply dipping around intersecting locations, write out a non-zero element file for seismic-tie regularization matrix with a value of $\lambda$, and a right-hand-side file with a value of $\lambda(V_i - V_j)$.

Step 110 includes combining A and B diagonally by shifting all column indices of the second system of Equation (8) by the number of velocity unknowns for the first system of Equation (7). Then, merge seismic-tie constraint into a new combined system of equation to build the left-hand side matrix as described in Equation (9) and (11). Also, $d_A$ and $d_B$ (step 48) are combined, and is merged by a right-hand-side of seismic-tie constraint sequentially as described in Equations (9) and (11).

Step 120 includes inverting the combined matrix in step 110 for velocity change, ($m_A$, $m_B$) for both 2D lines.

Step 130 includes splitting the updated velocity change ($m_A$, $m_B$) between each line, and updating a current velocity model for each line by adding $m_A$ and $m_B$, respectively, to their initial or immediately previous velocity model in order to create an updated or final velocity model (step 140).

After step 130, steps 30 and 40 are repeated by rerunning PSDM with an updated velocity model to generate new gather for each line (step 30), and measuring gather flatness (step 40). If gather is sufficiently flat, updated velocity models are saved as final velocity models. If gather is not sufficiently flat, the method reiterates through the steps until gather is sufficiently flat. A final velocity model could contain long and short wavelength of velocity features.

Although FIG. 4 shows an example of two intersecting 2D lines, this workflow can expand to more than two 2D lines using the same implementation above.

In FIG. 4, it is possible that gather for one line is sufficiently flat while the gather for the other line is not sufficiently flat. If such a situation would arise, the method would proceed as discussed above, but a velocity model that was used to generate sufficiently flat gather would not necessarily be further updated.

The updated velocity models generated by the process of FIG. 4 can be used to manage hydrocarbon production. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

EXAMPLES

Figure 5:
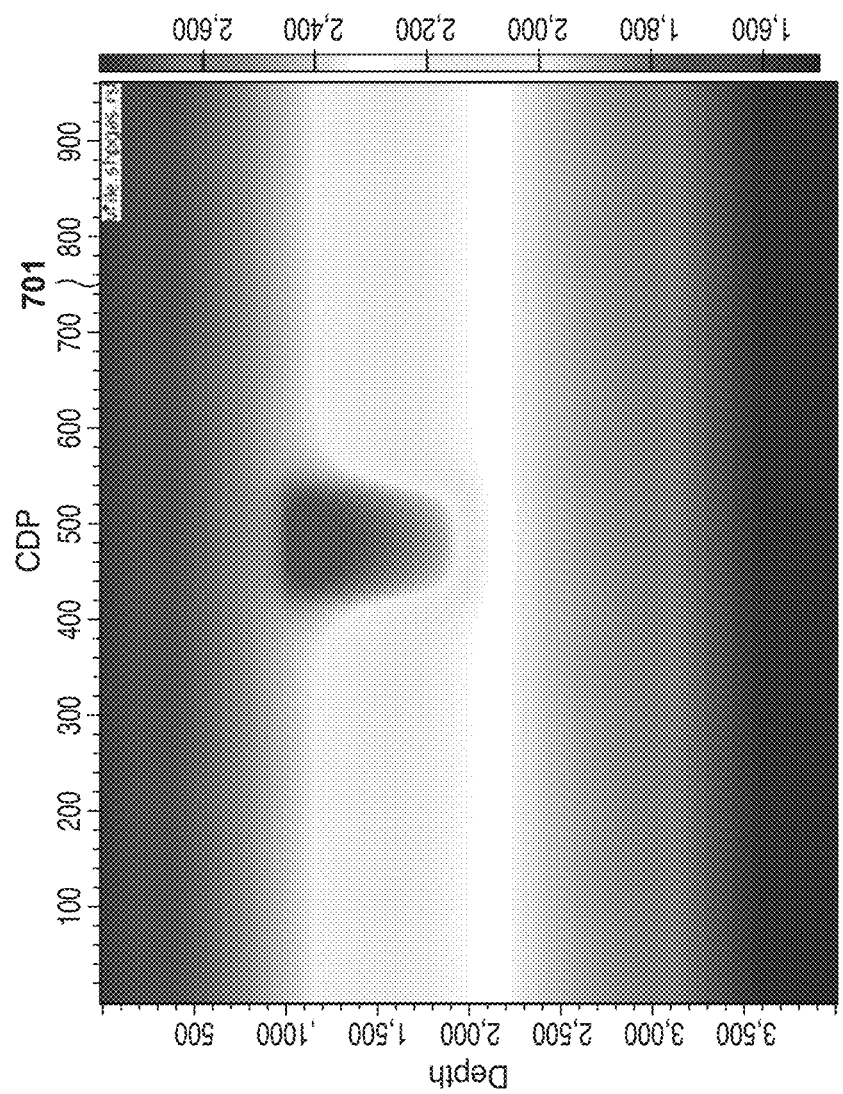
FIG. 5 illustrates an exemplary 2D synthetic velocity model.
Figure 6:
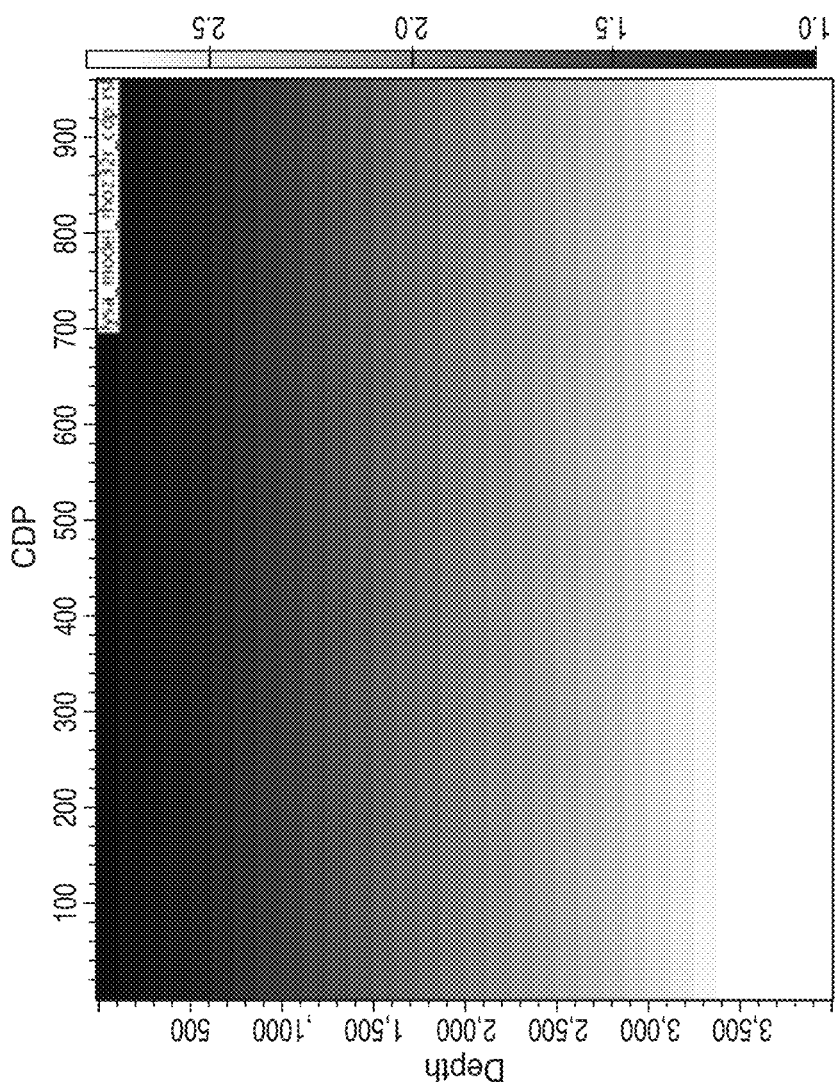
FIG. 6 illustrates an exemplary 2D synthetic density model.

FIG. 5 shows a 2D synthetic velocity model (701) including a low velocity anomaly of ~320 m/s with respect to a background velocity, linearly increasing with depth from 1600 to 2900 m/s (FIG. 5). FIG. 6 shows a 2D synthetic density model that increases stepwise from 1 to 2.7 g/cm$^3$ at every 200 m depth spacing. Elastic modeling was carried out to generate a synthetic dataset using the true velocity model (FIG. 5) and density model (FIG. 6) assuming that two seismic acquisitions are perpendicular to each other.

Figure 7:
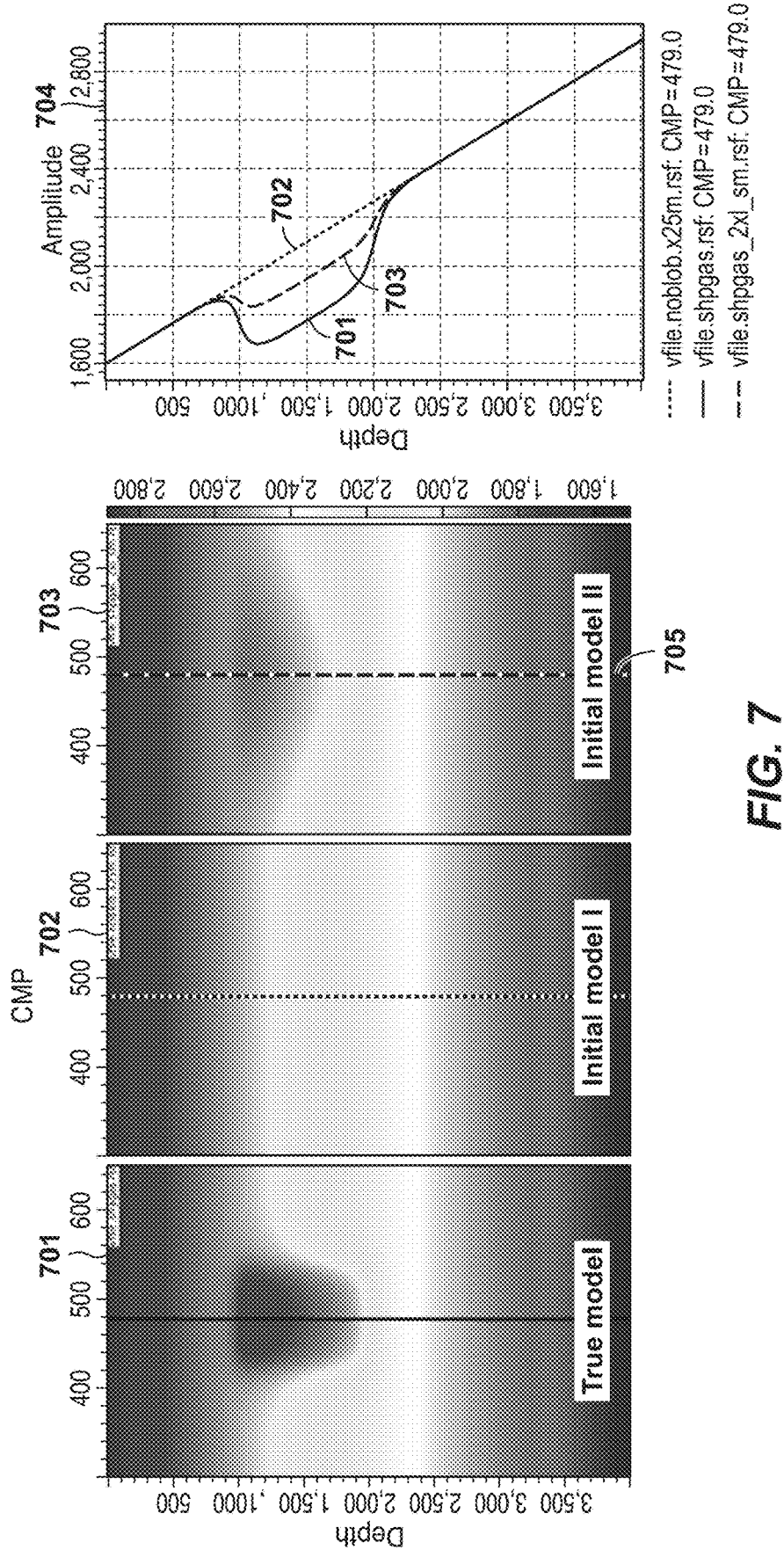
FIG. 7 illustrates an exemplary comparison between a true model and two initial velocity models.
Figure 8:
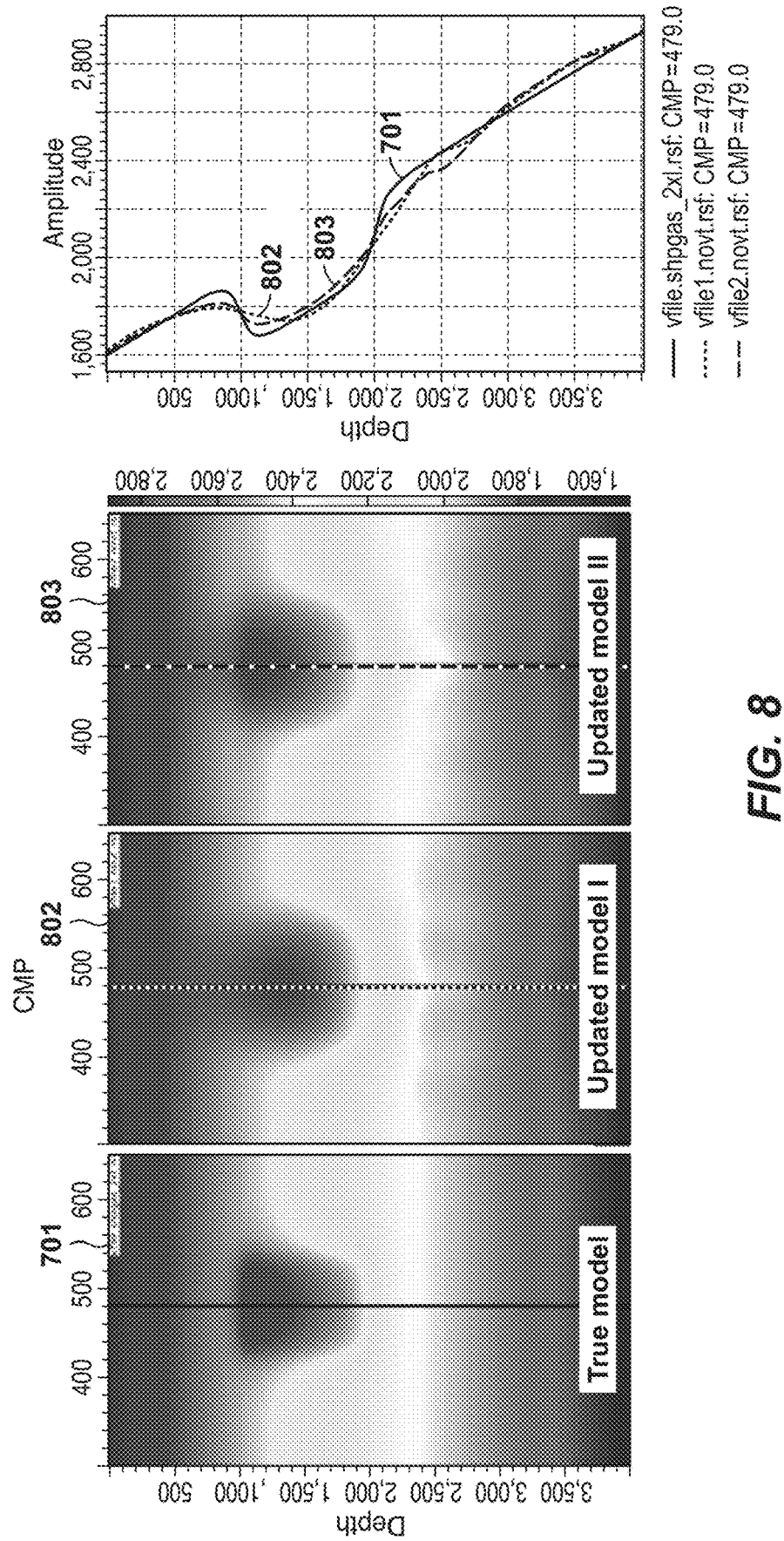
FIG. 8 illustrates an exemplary comparison between a true model and two updated velocity models without using the present technological advancement.

FIG. 7 shows a comparison of true model (701), initial model I (702) and initial model II (703), and vertical velocity functions (704) of the initial models at CMP 479 (705). The initial model I (702) has a background velocity only without the low velocity anomaly. Initial model II (703) was created from true velocity model (701) with heavy lateral smoothing. Using two different initial velocity models for each survey line (FIG. 7), 2D Kirchhoff PSDM was run to generate CIG gathers with 75-5975 m offsets (200 m spacing) for each model. Non-flatness in the gather was measured to create RDE for each line, and this was fed into tomography raytracing to build kernels and a data matrix (Equation 9). Velocity change is determined after tomographic inversion, and then added to initial velocity model for better gather flatness. Without a seismic-tie constraint, the updated velocity models from two different initial models are different at the intersecting point (FIG. 8), although these two acquisitions are intersecting at the same spatial location. The updated models (802) and (803) are different from each other at the same spatial location.

Figure 9:
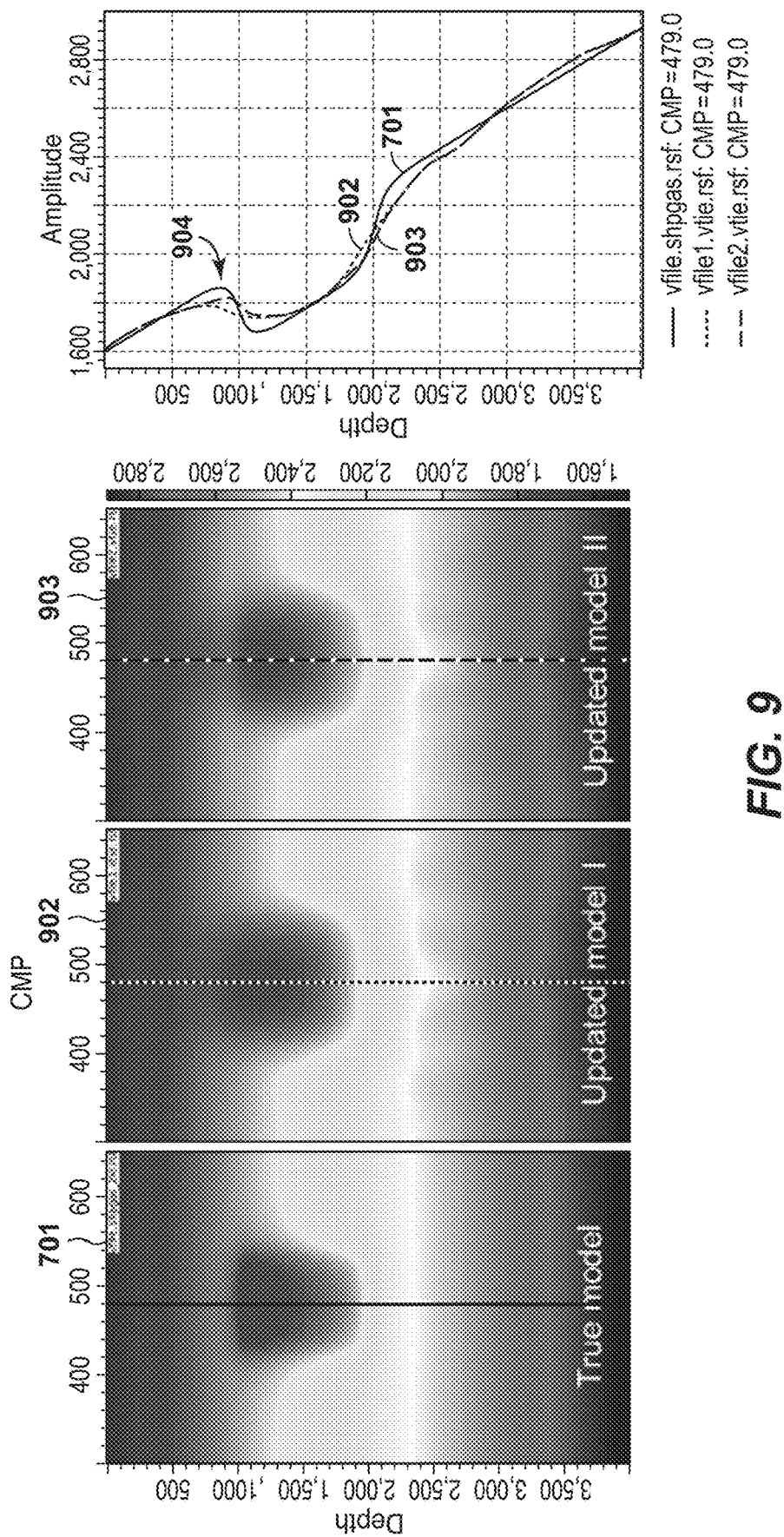
FIG. 9 illustrates an exemplary comparison between a true model and two updated velocity models using the present technological advancement.

The difference amongst (701), (802), and (803) is due to nonlinearity of reflection tomographic inversion, in which velocity change depends upon initial model and data selection. The present technological advancement, simultaneously updates the velocity models for multiple 2D lines with a seismic-tie constraint, which makes updated velocities to be more consistent at the intersecting point. Although there is still small differences between two updated models (902) and (903) at the boundary of the strong velocity anomaly (904) (FIG. 9), updated velocities becomes more close to the true velocity (701) compared with the ones without a seismic-tie constraint.

Figure 10:
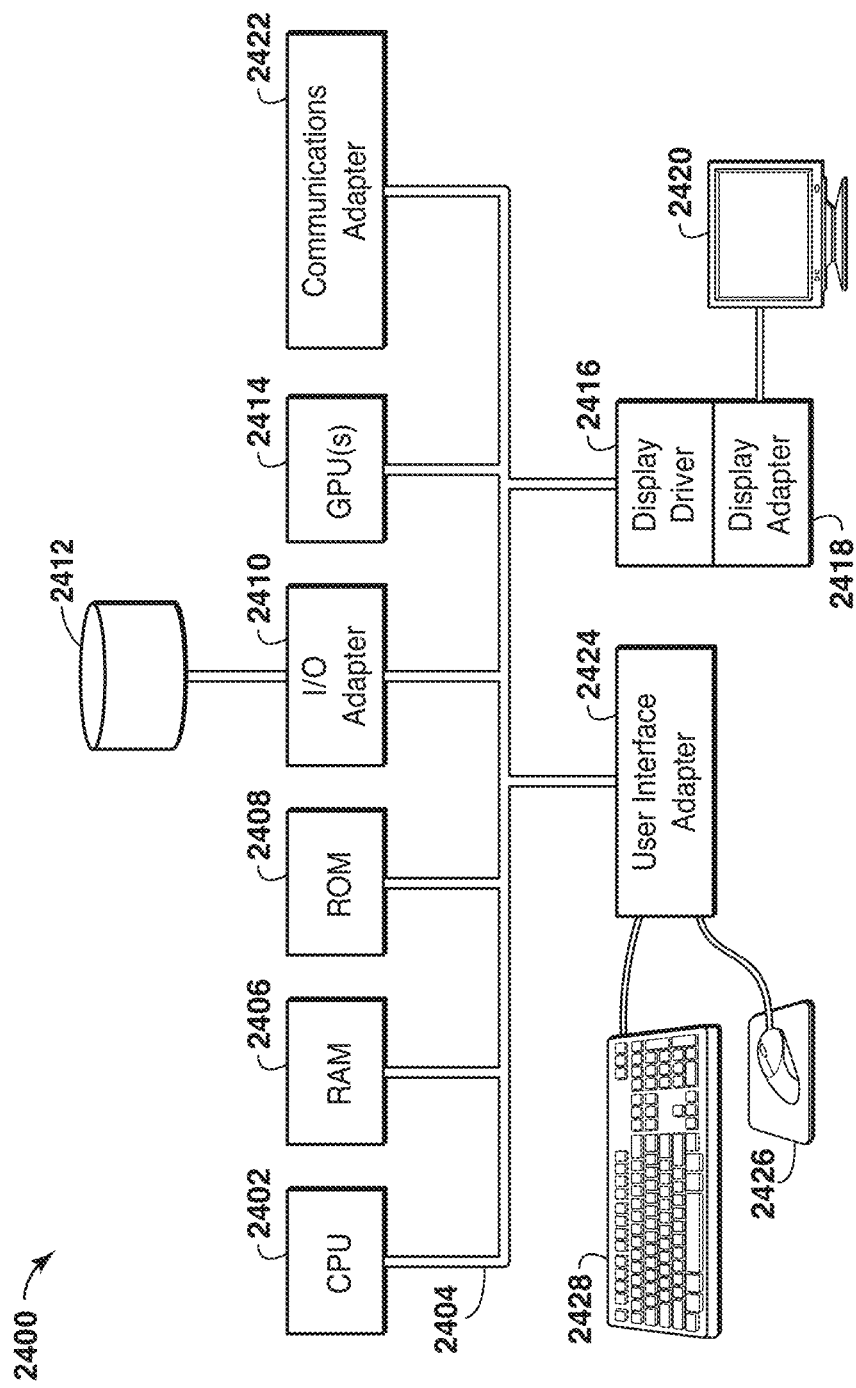
FIG. 10 illustrates an example of a computer system useable with the present technological advancement.

FIG. 10 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 10, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, 2414 GPUs, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method for generating updated velocity models from 2D seismic surveys to improve subsurface imaging of the Earth, comprising:
    generating one or more initial velocity models of intersecting 2D seismic survey lines;
    determining one or more reflector dipping angles for each initial velocity model; and
    adjusting one or more overburden velocities within the one or more initial velocity models using a seismic-tie regularization constraint in a 2D inversion process to compensate for out-of-plane effects on 2D velocities of the one or more initial velocity models to provide one or more updated velocity models, wherein the seismic-tie regularization constraint comprises a geometric correction parameter that is a function of the one or more reflector dipping angles, and wherein the seismic-tie regularization constraint causes the one or more updated velocity models to have consistent values for a depth of a reflector at intersecting spatial locations; and
    generating the improved subsurface image of the Earth using the one or more updated velocity models.

2. The method of claim 1, wherein a system of equations for the intersecting 2D seismic survey lines are merged diagonally, instead of vertically, to cause the one or more updated velocity models to have consistent values for the depth of the reflector at said intersecting spatial locations.

3. The method of claim 2, wherein the system of equations that are merged diagonally include null matrices on a diagonal opposite to a diagonal of the system of equations for the intersecting 2D seismic survey lines.

4. The method of claim 3, wherein the system of equations that are merged diagonally include a trade-off parameter to adjust regularization of the seismic-tie regularization constraint.

5. The method of claim 1, wherein the 2D inversion process provides the one or more updated velocity models from residual depth error measurements from common image gathers, raytracing based on the one or more initial velocity models, and the seismic-tie regularization constraint.

6. The method of claim 1, further comprising:
    generating a 2D seismic reflectivity image from a 2D pre-stack depth migration for each of the one or more-initial velocity models; and
    determining, for each 2D seismic reflectivity image, one or more depth shifts for one or more reflectors within each 2D seismic reflectivity image with respect to a particular reference depth;
    wherein the 2D inversion process further comprises using the one or more depth shifts.

7. The method of claim 6, wherein the particular reference depth is a nearest offset trace.

8. The method of claim 1, wherein the 2D inversion process further comprises determining one or more velocity updates for each of the one or more initial velocity models using a numerical solver; and splitting the one or more velocity updates between intersecting 2D seismic survey lines for each of the one or more initial velocity models.

9. The method of claim 1, wherein each of the one or more initial velocity models has a different seismic-tie regularization constraint.

10. The method of claim 1, wherein the seismic-tie regularization constraint further comprises a trade-off parameter and wherein the 2D inversion process further comprises updating at least one of the initial velocity models by adjusting the trade-off parameter.

11. The method of claim 10, wherein as the trade-off parameter increases, greater weight is placed on the seismic-tie constraint.

12. The method of claim 1, further comprising drilling a well at a location determined at least in part from the one or more updated velocity models and extracting hydrocarbons from the well.

\* \* \* \* \*